(12) United States Patent
Whittaker et al.

(10) Patent No.: US 7,401,261 B1
(45) Date of Patent: Jul. 15, 2008

(54) AUTOMATIC ANALYSIS OF MEMORY OPERATIONS USING PANEL DUMP FILE

(75) Inventors: Bruce Ernest Whittaker, Lake Forest, CA (US); Leland Elvis Watson, Temecula, CA (US)

(73) Assignee: Unisys Corporation, Blue Bell, PA (US)

( * ) Notice: Subject to any disclaimer, the term of this patent is extended or adjusted under 35 U.S.C. 154(b) by 451 days.

(21) Appl. No.: 10/741,397

(22) Filed: Dec. 19, 2003

(51) Int. Cl.
*G06F 11/00* (2006.01)

(52) U.S. Cl. .............................. 714/46; 714/37; 714/47; 714/57

(58) Field of Classification Search .................. 714/37, 714/45, 46, 57, 42, 48
See application file for complete search history.

(56) References Cited

U.S. PATENT DOCUMENTS

| | | | |
|---|---|---|---|
| 5,819,024 A * | 10/1998 | Kasuga et al. ................. | 714/26 |
| 6,490,585 B1 * | 12/2002 | Hanson et al. ................. | 707/10 |
| 6,681,348 B1 * | 1/2004 | Vachon ......................... | 714/45 |
| 6,708,293 B2 * | 3/2004 | Kaler et al. .................... | 714/46 |
| 7,062,677 B1 * | 6/2006 | Chigurupati .................. | 714/45 |
| 7,171,593 B1 * | 1/2007 | Whittaker et al. ............. | 714/46 |
| 2003/0088425 A1 * | 5/2003 | Lam et al. ....................... | 705/1 |
| 2004/0093538 A1 * | 5/2004 | Hester et al. ................... | 714/45 |

* cited by examiner

*Primary Examiner*—Robert W Beausoliel, Jr.
*Assistant Examiner*—Joseph D Manoskey
(74) *Attorney, Agent, or Firm*—Phuong-Quan Hoang; Robert P. Marley; Charles A. Johnson (57) ABSTRACT

An embodiment of the present invention is a technique to provide a graphical user interface (GUI) to analyze memory operations in a computer system. A job summary window shows state information of jobs in at least a unit panel. The unit panel represents at least a functional unit in the computer system. A memory job window shows state information of memory jobs in a functional unit selected from the unit panel to provide diagnostic information to the user. The state information being obtained from a panel dump file retrieved from the computer system.

30 Claims, 8 Drawing Sheets

AUTOMATIC ANALYSIS OF MEMORY OPERATIONS USING PANEL DUMP FILE

CROSS-REFERENCE TO RELATED APPLICATIONS

This application is related to the following patent applications: Ser. No. 10/741,455, entitled "Panel Grouping For System State Analysis"; Ser. No. 10/741,391, entitled "Displaying Abnormal And Error Conditions In System State Analysis", issued as U.S. Pat. No. 7,171,593 on Jan. 30, 2007; Ser. No. 10/741,398, entitled "Diagnostic Tools For System Analysis Using Panel Dump File"; Ser. No. 10/742,158, entitled "Automatic Analysis Of Memory-Mapped I/O Operations Using Panel Dump File"; Ser. No. 10/742,115, entitled "Backward Location Finder Search In Panel Dump File"; Ser. No. 10/742,116, entitled "Recording Relevant Information In A GUI Window Of A Panel Dump Browser Tool"; Ser. No. 10/742,117, entitled "Reconstructing Bus Activities Using A Panel Dump File"; all filed on the same date and assigned to the same assignee as the present application, the contents of each which are herein incorporated by reference.

BACKGROUND

1. Field of the Invention

Embodiments of the invention are in the field of system analysis, and more specifically, relate to system state analysis tools.

2. Description of Related Art

System crashes as a result of faulty software are usually detected by the operating system. The operating system typically saves the state of system memory in a memory dump file. A debugger tool is used off-line to analyze such memory dump files. In the cases where the crashes are caused by hardware failures, memory dump file containing information regarding the state of the system memory cannot be used for the analysis since it is the state of the system component elements, not the state of the system memory, that is required. This state of the system is usually represented by the contents of the registers and/or storage elements relevant to the operation of the system. For large systems, the core of the hardware architecture may include a large number of processors, application specific integrated circuits (ASICs), etc. In large systems, the system state may be accessed through various means by a system maintenance processor. The system maintenance processor organizes the state into panels as the hardware state is taken. This state is then saved into a large text file called a panel dump file. A panel is a grouping of state bits that logically work together.

Examining the contents of the panel dump file to obtain meaningful interpretation of the system state is a challenge. Existing techniques for analysis of the system state has a number of drawbacks. An expert typically uses some text editing tool and search manually through the panel dump file for pertinent and helpful data. The procedure requires a high level of expertise and is very time-consuming and error-prone.

SUMMARY OF THE INVENTION

An embodiment of the present invention is a technique to provide a graphical user interface (GUI) to analyze memory operations in a computer system. A job summary window shows state information of jobs in at least a unit panel. The unit panel represents at least a functional unit in the computer system. A memory job window shows state information of memory jobs in a functional unit selected from the unit panel to provide diagnostic information to the user. The state information being obtained from a panel dump file retrieved from the computer system.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the present invention is a technique to provide a graphical user interface (GUI) to analyze memory operations in a computer system. A job summary window shows state information of jobs in at least a unit panel. The unit panel represents at least a functional unit in the computer system. A memory job window shows state information of memory jobs in a functional unit selected from the unit panel to provide diagnostic information to the user. The state information being obtained from a panel dump file retrieved from the computer system.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the present invention is a panel dump browser tool to analyze system state and/or behavior of a computer system from a panel dump file. The system state is typically represented or defined by a set of relevant registers internal to a number of devices, processors, or ASICs. The panel dump browser tool has a graphical user interface (GUI) that presents the state information of the computer system in a well-structured and well-organized manner.

The GUI of the panel dump browser tool provides a number of benefits to the user. First, it provides useful diagnostic information such as state information of active jobs and/or active memory jobs in a functional unit. Second, it provides state information of memory jobs at various stages of the data flow as clues to the user to derive a conclusion regarding the possible causes of the system failure. Third, it provides efficient navigation by organizing the information in a hierarchical manner.

Figure 1A:
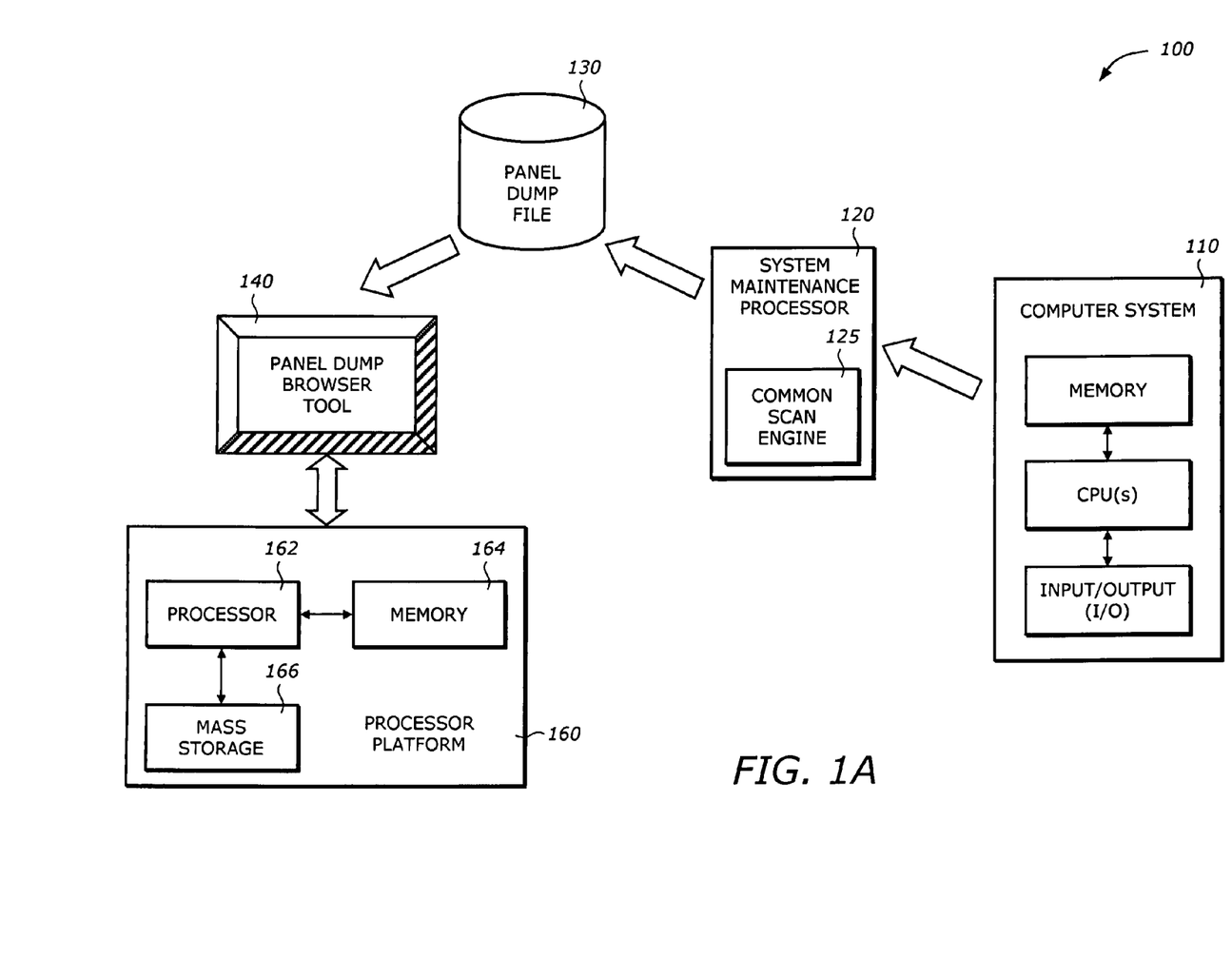
FIG. 1A is a diagram illustrating a system in which one embodiment of the invention can be practiced
Figure 1B:
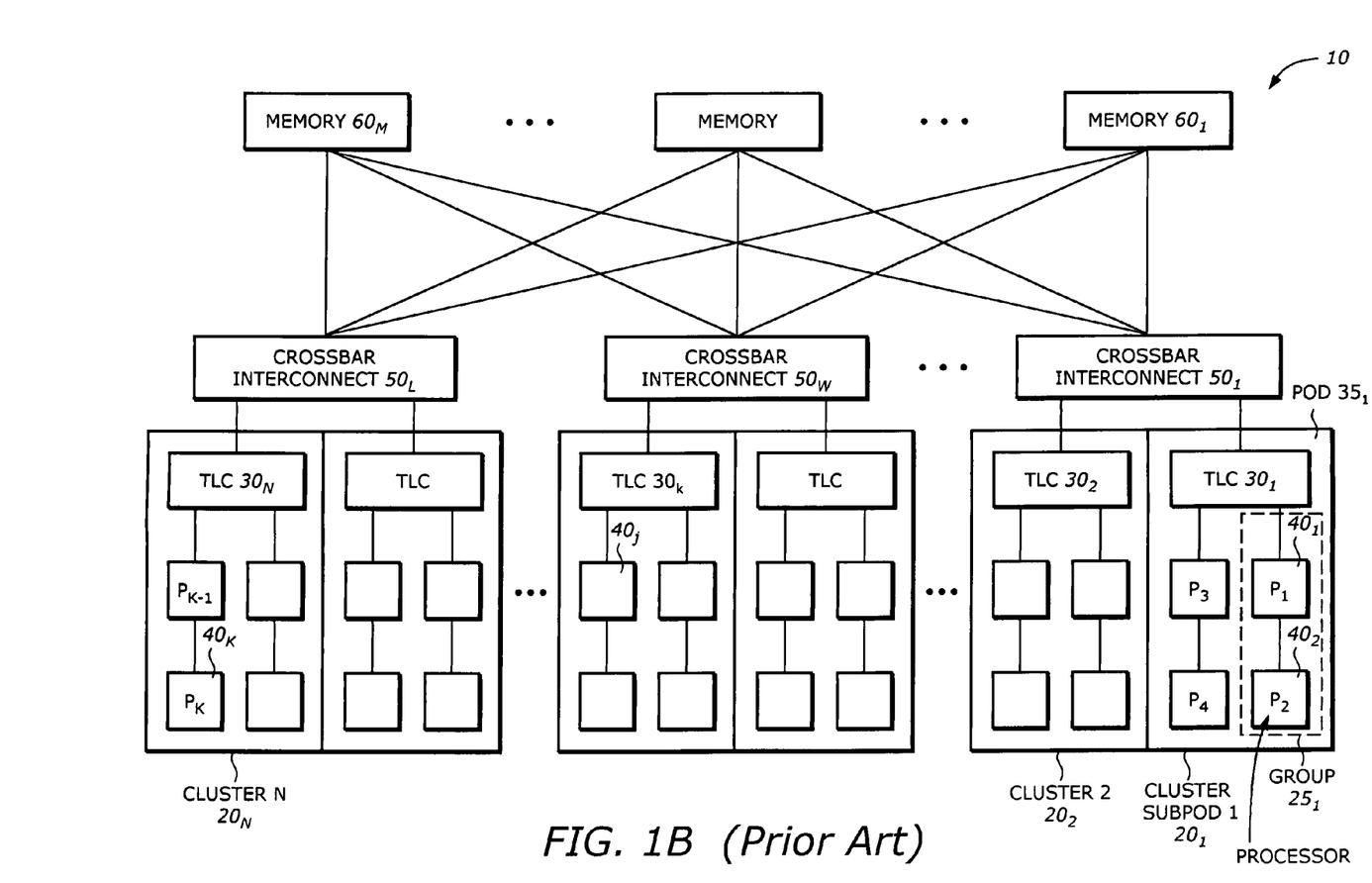
FIG. 1B is a diagram illustrating an embodiment 10 of the computer system 110 of FIG. 1A.

The system state analysis tool may interface with a multiprocessor system as described in FIG. 1B, a single processor system, or any other systems. Special drives, routines, or functions are provided to read the contents of the registers. A system state is presented as a snapshot of these registers. The GUI allows the user to use any convenient wired or wireless input devices to navigate such as mouse, keyboard, trackball, etc. An action is performed when input device is activated or clicked when it is positioned at an appropriate location on the display screen.

FIG. 1A is a diagram illustrating a system 100 in which one embodiment of the invention can be practiced. The system 100 includes a computer system 110, a system maintenance processor 120, a panel dump file 130, a panel dump browser tool 140, and a processor platform 160.

The computer system 110 may be any computer system. It may be a multiprocessor system, a cellular multiprocessor system, a single processor system, a network of computers, an array of processors, etc. Typically, the computer system 110 is functionally organized as having a hierarchical structure of several levels. At the highest level, the computer system 110 may have several functional units of different types. For each type of functional unit, there may be several identical functional units. For example, the computer system 110 may be a cellular multiprocessor system which includes clusters of processors. Each cluster of processors forms a subpod. There may also be several memory storage units (MSU's) which are connected to the subpods. Each subpod may contain several processors, each having similar or different functions. Each processor may include several elements such as data queue, arithmetic logical unit, memory read register, memory write register, etc. Since the architecture of the computer system 110 may be quite complex, it is useful to show the relationships of these functional units or subunits in a logical manner.

The system maintenance processor 120 is a processor that is dedicated to monitor the computer system 110 and to extract state information from the computer system 110 during a crash or at any other selected point in time. The system maintenance processor 120 may have access to several test points in the computer system 110. These test points may be provided at various status registers or serial shift registers for testing purposes. The system maintenance processor 120 includes a common scan engine 125. The common scan engine 125 scans all or most components of the computer system 110 to read their status or content, or state information. When there is a hardware failure that causes system crash, or upon an operator's command instructions, the system maintenance processor 120 retrieves the state information and writes all the information in the panel dump file 130 on a mass storage device for off-line analysis.

The panel dump file 130 is a file that contains all the necessary state information for analysis. The panel dump file 130 in essence is a text file arranged according to how the system maintenance processor 120 retrieves the information. For a large computer system such as a cellular multiprocessor system, the panel dump file 130 may contain several thousands lines of text.

The panel dump browser tool 140 is a system analysis tool that reads the panel dump file 130 and organizes the state information in a useful form. The panel dump browser tool 140 has a GUI that allows the user to examine the state information by navigating through several display panels or screens.

The processor platform 160 is a computer system that interfaces with the panel dump browser tool. It includes a processor 162, a memory 164, and a mass storage device 166.

The processor 162 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The memory 164 stores system code and data. The memory 164 is typically implemented with dynamic random access memory (DRAM) or static random access memory (SRAM).

The system memory may include program code or code segments implementing one embodiment of the invention. The memory 164 includes a panel dump browser tool 140 when loaded from mass storage. The panel dump browser tool 140 may also simulate the system panel browsing functions. The panel dump browser tool 140 contains instructions that, when executed by the processor 162, cause the processor to perform the tasks or operations as described in the following.

The mass storage device 166 stores archive information such as code, programs, files, data, databases, applications, and operating systems. The mass storage device 166 may include compact disk (CD) ROM, a digital video/versatile disc (DVD), floppy drive, and hard drive, and any other magnetic or optic storage devices such as tape drive, tape library, redundant arrays of inexpensive disks (RAIDs), etc. The mass storage device 166 provides a mechanism to read machine-accessible media. The machine-accessible media may contain computer readable program code to perform tasks as described in the following.

FIG. 1B is a diagram illustrating an embodiment 10 of the system 110 of FIG. 1A. The system 10 includes N clusters of processors $20_1$ to $20_N$, L crossbar interconnects $50_1$ to $50_L$ and M memories $60_1$ to $60_M$. The system 10 is referred to as a cellular multiprocessor system.

Each of the clusters of processors $20_1$ to $20_N$ forms a subpod and includes a number of processor subsystems $40_j$'s and a third level cache (TLC) $30_k$'s. The processor subsystems $40_j$'s within each cluster $20i$ further form into groups connected together via a bus structure. Each group is connected to the TLC $30_k$. It is contemplated that the number of processor subsystems $40_j$'s in a group and the number of groups in a cluster may be any suitable number according to the configuration. As illustrated in FIG. 1A, the processor subsystems $40_j$'s form two groups and each group consists of two processor subsystems. Each of the TLC $30_k$'s provides another level of cache memory in addition to the second level (L2) and first level (L1) caches in each of the processor subsystems $40j$'s. Each of the TLC $30_k$'s provides a larger cache memory than the L2 and L2 cache to improve performance by allowing the processors within a subpod or group to share cached information. The TLC $30k$'s may be implemented by any suitable memory technologies, including static random access memory (SRAM) and dynamic random access memory (DRAM). It is contemplated that a cache coherence protocol is maintained throughout the system 10.

Each of the crossbar interconnects $50_1$ to $50_L$ is a crossbar switch connected to the memories $60_1$ to $60_M$ and a number of clusters of processors. The clusters of processors that are connected to each crossbar interconnect form a pod. The crossbar interconnect $50_m$'s fully connects any one of memories $60_1$ to $60_M$ to any one of the clusters of processors in the pod that it is connected to. Each of the memories $60_1$ to $60_M$ is accessible to any of the processor subsystems $40j$'s via the crossbar interconnects $50_m$'s. The memories may be implemented by any suitable memory technologies including SRAM and DRAM.

Figure 2:
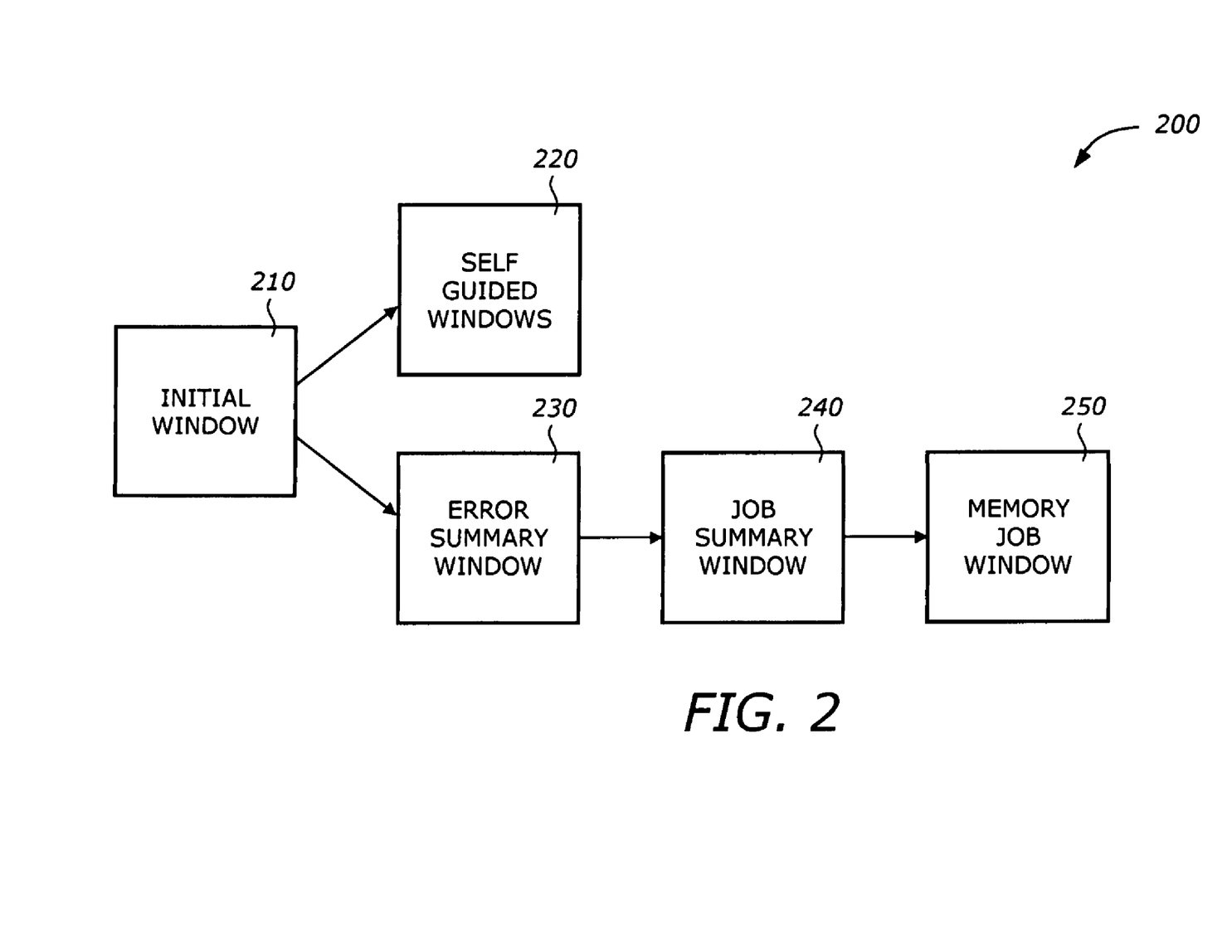
FIG. 2 is a diagram illustrating a GUI architecture for the panel browser tool according to one embodiment of the invention.

FIG. 2 is a diagram illustrating a GUI architecture 200 for the panel browser tool according to one embodiment of the invention. The structure 200 includes an initial window 210, a self-guided window 220, an error summary window 230, a job summary window 240, and a memory job window 250.

The initial window 210 is the first window to be displayed when the browser tool is started or when the analysis function of the browser tool is started. The initial window 210 allows the user to select either pursuing a self-guided analysis by using the various panels of the tool or pursuing an automatic sequence of analysis.

The automatic sequence includes the error summary window 230, the job summary window 240, and the memory job window 250. The automatic sequence performs most of the analysis for the user. The user needs only to integrate or combine the information obtained from these windows to arrive at a logical conclusion regarding the possible causes of the system failure.

The self-guided window 220 provides a series of screens or windows that guide the user through the analysis by presenting the diagnostic information in a useful manner. The self-guided window 220 typically requires the user to have a somewhat high level of knowledge and experience.

Figure 3:
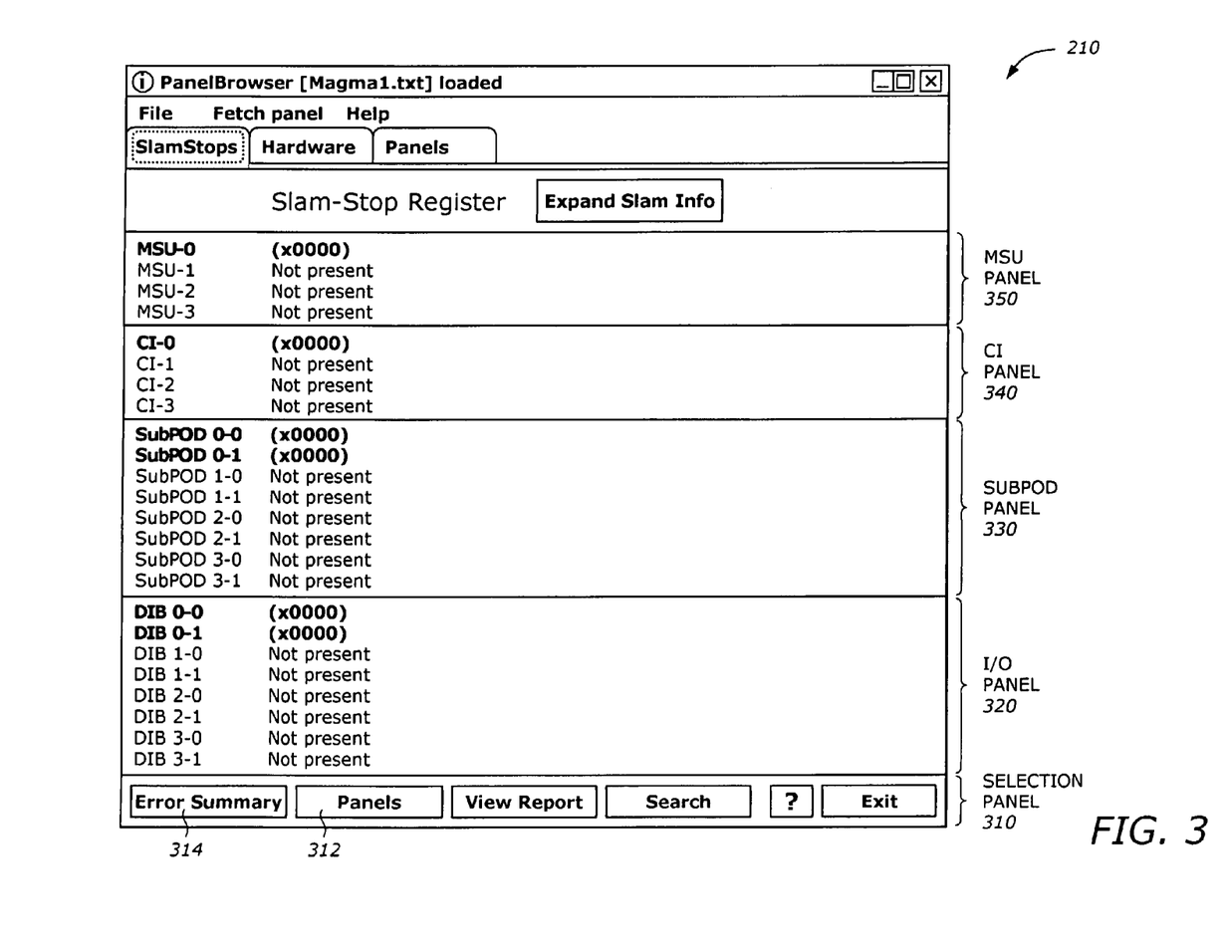
FIG. 3 is a diagram illustrating an initial window according to one embodiment of the invention.

FIG. 3 is a diagram illustrating the initial window 210 according to one embodiment of the invention. The initial window 210 includes a selection panel 310, an input/output (I/O) panel 320, a subpod panel 330, a CI panel 340, and an memory storage unit (MSU) panel 350.

The selection panel 310 allows the user to select between a self-guided analysis and an automatic analysis. The self-guided analysis is selected by pressing a Panels button 312. The automatic analysis is selected by pressing an error summary button 314. Other selections can be made regarding report viewing and search.

The I/O panel 320 shows the I/O units and their state information as actually used in the system. I/O units that are not actually used or configured in the system are grayed out. Similarly, the subpod panel 330 shows the subpod or processors and their state information as actually used in the system. Subpods or processors that are not actually used or configured in the system are grayed out. The CI panel 340 shows the CI units and their state information as actually used in the system. CI units that are not actually used or configured in the system are grayed out. The memory storage unit (MSU) panel 340 shows the MSU's and their state information as actually used in the system. MSU's that are not actually used or configured in the system are grayed out.

Figure 4:
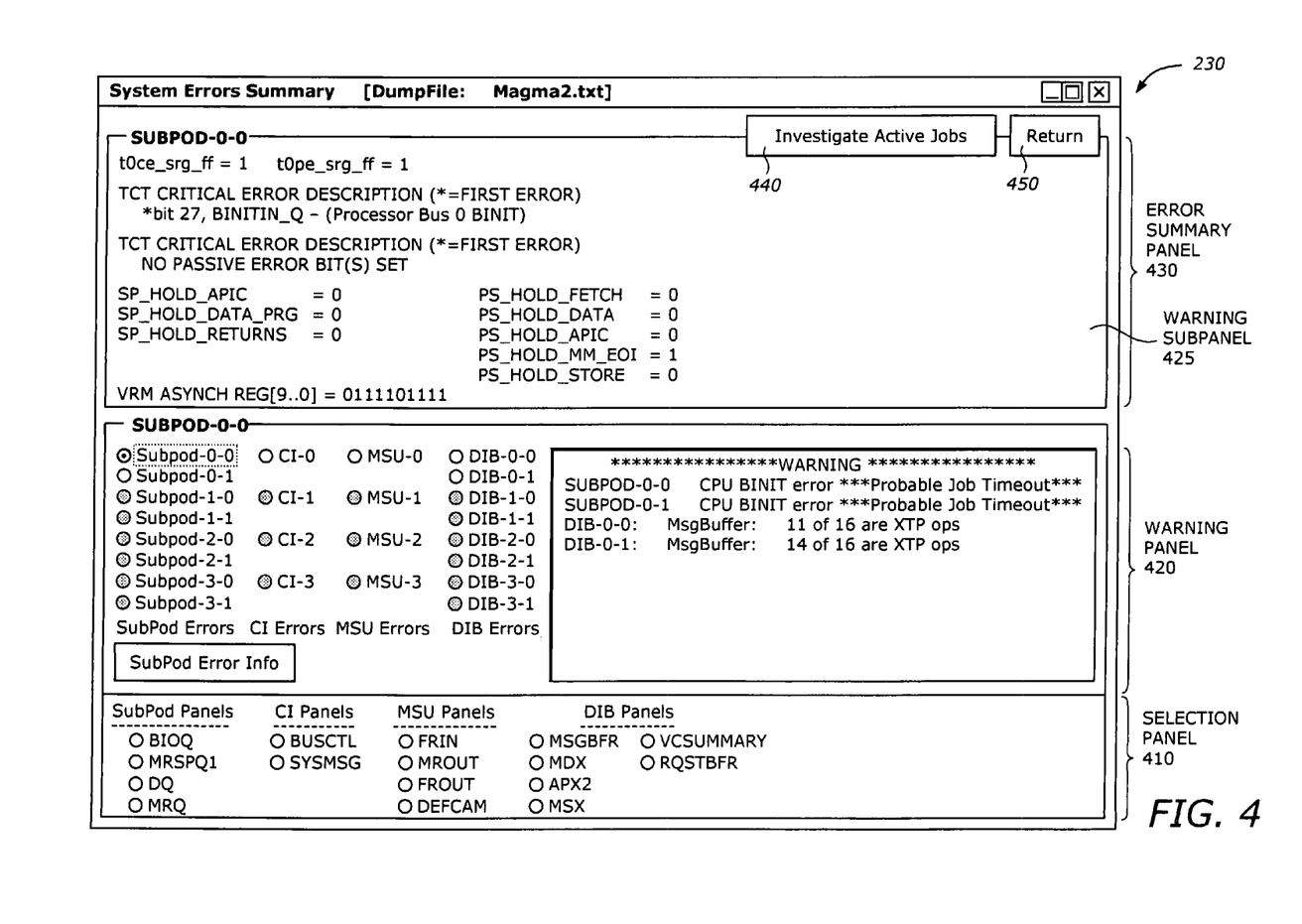
FIG. 4 is a diagram illustrating an error summary window according to one embodiment of the invention.

FIG. 4 is a diagram illustrating the error summary window 230 according to one embodiment of the invention. The error summary window 230 includes a selection panel 410, a warning panel 420, and an error summary panel 430. It provides information regarding the specific error condition of a selected unit or subunit. Examples of the error condition may be an incomplete job, a job timeout, etc.

The selection panel 410 allows the user to select viewing a panel selected from a number of functional units. It provides the user a means to obtain more information regarding a specific panel, either to enhance the user's understanding of the system state, or to allow the user to pursue the self-guided analysis.

The warning panel 420 displays a warning message regarding a problem or a potential problem that may cause faults or failures. The warning panel 420 includes a selection area to allow the user to select a unit or subunit to view any warning. A warning subpanel 425 containing warning messages is displayed for the selected unit or subunit. The example in FIG. 4 shows that the subpod 0-0 is selected. The warning subpanel 425 displays a warning message of a job timeout. Typically, the warning message is based on known or common failure symptoms.

The error summary panel 430 shows a summary of the error(s) for the selected unit or subunit. The error description is shown along with the specific data of the state information that points to the error. Usually, the unit or subunit that has error is distinguished from a normal unit or subunit by some distinguishing indicator such as a designated color (e.g., font in RED).

One useful analysis task is to analyze the execution or completion of a job. A job is in essence a transaction or an operation that is executed or processed in the computer system. There are many operations or processes that are useful for the determination of the cause(s) of the system failures. Examples of these operations are processor-related operations, memory operations, memory-mapped or I/O operations, etc. The present invention allows the user to obtain diagnostic information for memory operations. Memory operations are operations or transactions that relate to accesses to the memory unit. An access transaction may go through several stages or phases in the data paths of the system from the originator to the destination. For example, a processor in a subpod may issue an instruction that writes an operand to a memory. The access transaction may include stages at the processor bus, the cache unit, and the memory unit. If contents or state information at each stage of the data path are captured and presented to the analyst, useful information or relevant diagnostic conclusions can be obtained to identify, isolate, or pinpoint to an area or element that is problematic or faulty.

Figure 5:
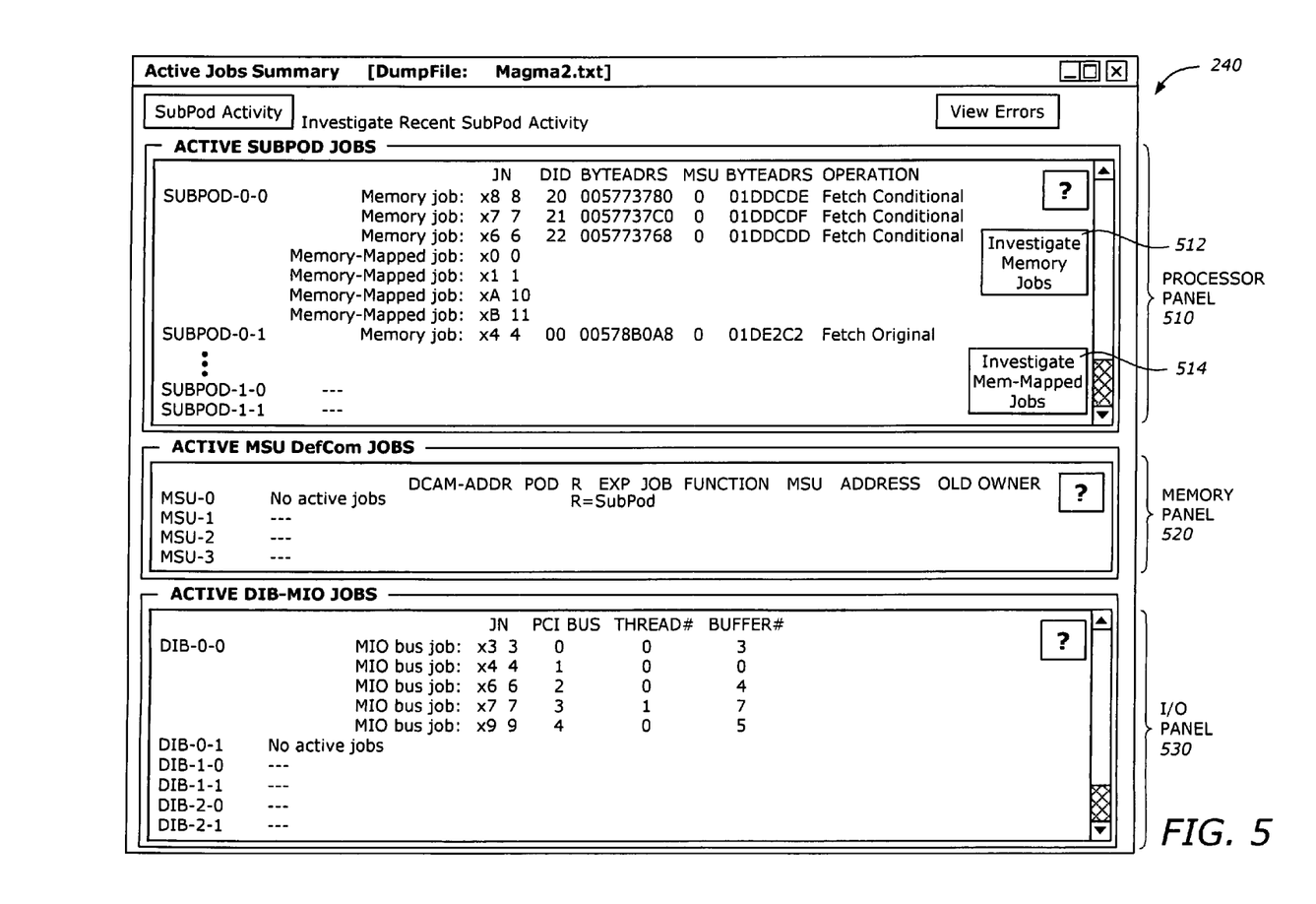
FIG. 5 is a diagram illustrating a job summary window according to one embodiment of the invention.

FIG. 5 is a diagram illustrating the job summary window 240 according to one embodiment of the invention. The job summary window 240 includes a processor panel 510, a memory panel 520, and an I/O panel 530. The job summary window 240 may include panels of other functional units or subunits that are relevant to the data flow of operations that are related to memory accesses.

The processor panel 510 displays status of memory jobs and memory-mapped jobs in the processor unit. The memory jobs are jobs or transactions that are related to accesses to the memory unit(s). The memory-mapped jobs are jobs or transactions that are related to accesses to devices or units that are mapped to the memory address space of the processor unit. The processor unit includes the processor, a processor group, or a subpod that issues the jobs or transactions. The status of a memory job or memory-mapped job may be active, inactive, suspended, aborted, queued, or any other suitable status as configured in the system. The state information of any active memory job in the processor unit may be useful to determine the cause of the problem and/or to help in tracing the data flow of a transaction or operation. In one embodiment, the state information includes the job identifier or job number (JN) to identify an active job, a deferred identifier (DID) to identify the active job as seen at a processor bus interface of the processor, a processor address (BYTE ADDR) associated with the active job as generated by the processor, a memory unit identifier (MSU) to specify a memory unit that the active job is destined for, a memory address (MSU ADDR) to specify a cache-line address of the active job at the memory unit, and an operation indicator to indicate a memory operation type of the active job.

The processor panel 510 may include buttons 512 and 514 to allow the user to select "investigate memory jobs" and "investigate memory-mapped jobs", respectively. When the button 512 is pressed or clicked, the user is directed to the memory job window 250 to continue the automatic analysis. When the button 514 is pressed or clicked, the user is directed to a memory-mapped job window.

The memory panel 520 displays status of memory and memory-mapped jobs in the memory unit. In normal conditions, there should not be any activity left within the memory unit. Any job that is still active in the memory unit may indicate a problem such as a cache coherence problem. The state information of any active memory job in the memory unit may be useful to determine the cause of the problem and/or to help in tracing the data flow of a transaction or operation. In one embodiment, the state information includes the index of the deferred memory panel where the job is observed, the specific pod where the job is originated, the specific subpod that the job is originated, the expansion memory that the job involves, the job identifier or job number, the specific type of memory operation, the cache line level address in the memory unit, and the old owner (i.e, the subpod cache where the old value is stored)

The I/O panel 530 displays status of memory-mapped jobs initiated by the I/O unit. These jobs are not initiated by a processor.

Note that at any time the user can return to the self-guided analysis by selecting an appropriate panel in the selection panel. The user may also return to the initial window by pressing a return button.

Figure 6A:
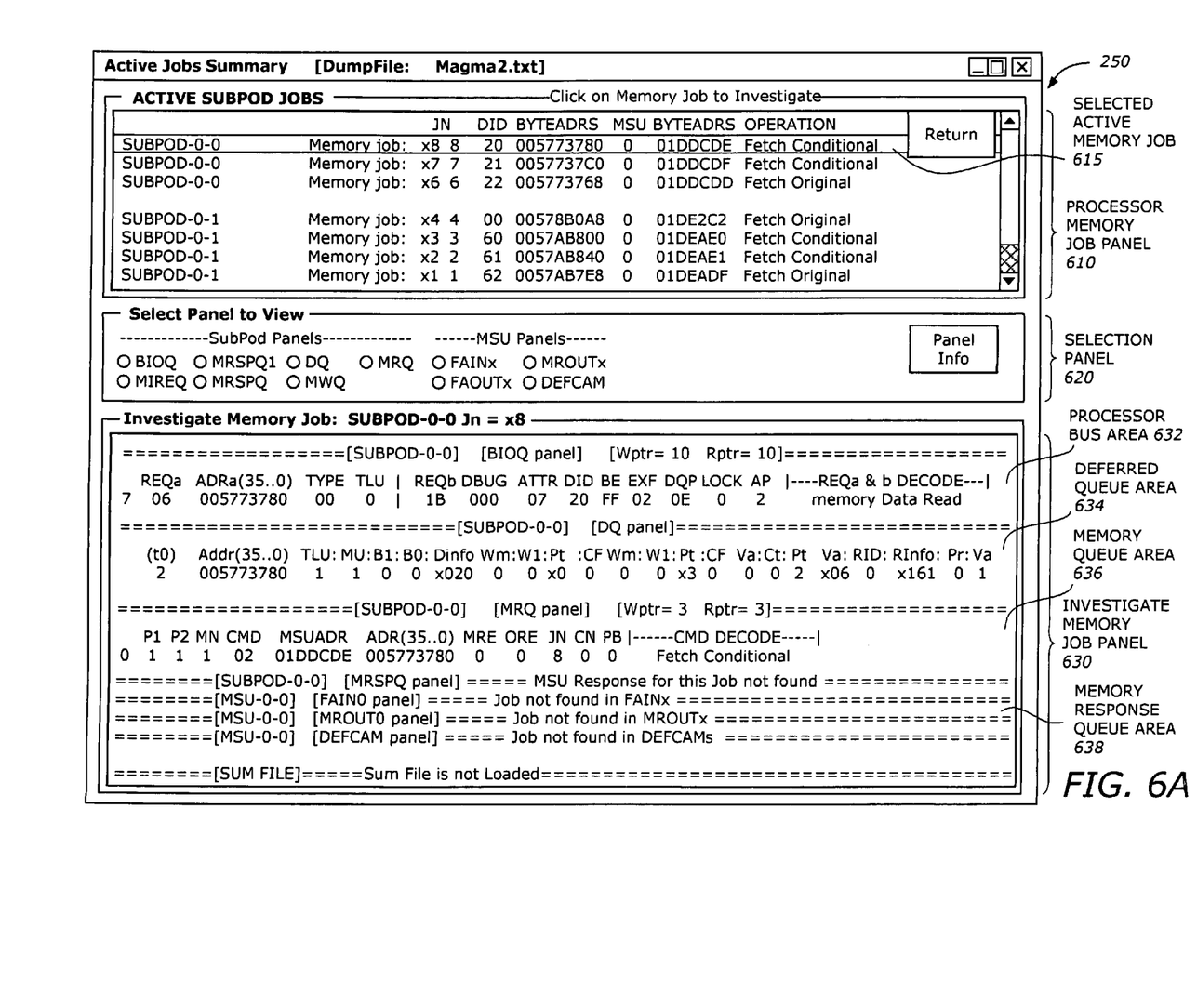
FIG. 6A is a diagram illustrating a memory job window for a first job according to one embodiment of the invention.

FIG. 6A is a diagram illustrating the memory job window 250 for a first job according to one embodiment of the invention. The memory job window 250 includes a processor memory job panel 610, a selection panel 620, and an investigate memory job panel 630.

The processor memory job panel 610 displays a list of active memory jobs in the processor unit. The list of the active memory jobs is organized in tabular form with state information related to the job such as the job number, DID, BYTE ADDR, MSU, MSU ADDR, and operation. The user can select any of the active jobs on the list to view additional information in the investigate memory job panel 630. A selected active memory job 615 is highlighted when selected by the user.

The selection panel 620 allows the user to select a panel for a unit or a subunit for viewing. It allows the user to switch to the self-guided analysis. It may also include buttons to provide information on a particular panel.

The investigate memory job panel 630 displays detailed information on the active memory job selected from the list in the processor memory job panel 610. It has a number of areas to display the state information: (1) a processor bus area 632 to display state information of the selected active memory job originated from a processor bus, (2) a deferred queue area 634 to display state information of the selected active memory in a deferred queue, (3) a memory queue area 636 to display state information of the selected active memory job in a memory request queue, and (4) a memory response queue area 638 to display state information of the selected active memory job in the memory response queue.

The state information revealed by the investigate memory job panel 630 may provide clues to locate or identify the source of the system failure, especially when it is combined with other state information in other jobs or other windows.

In the example of FIG. 6A, the job number 8 (JN=8) is selected from subpod 0-0. The processor bus area 632 indicates that the origin of this job is derived from the BIOQ. The deferred queue area 634 indicates that it is a deferred job, which means that there is not a cache hit, leading to a memory operation. The memory queue area 636 indicates that the memory request was initiated to the memory. Suppose that the memory panel 520 (FIG. 5) indicates that the job number 8 is not active. This information, together with the fact that it is active in the processor unit, may indicate two scenarios. In the first scenario, the job has been completed by the memory, but the originating processor or subpod never received back the requested data. In the second scenario, the system stopped (e.g., clocks being stopped by the maintenance processor) before the job had time to finish. Additional information from the state information of other active jobs may provide helpful hints.

Figure 6B:
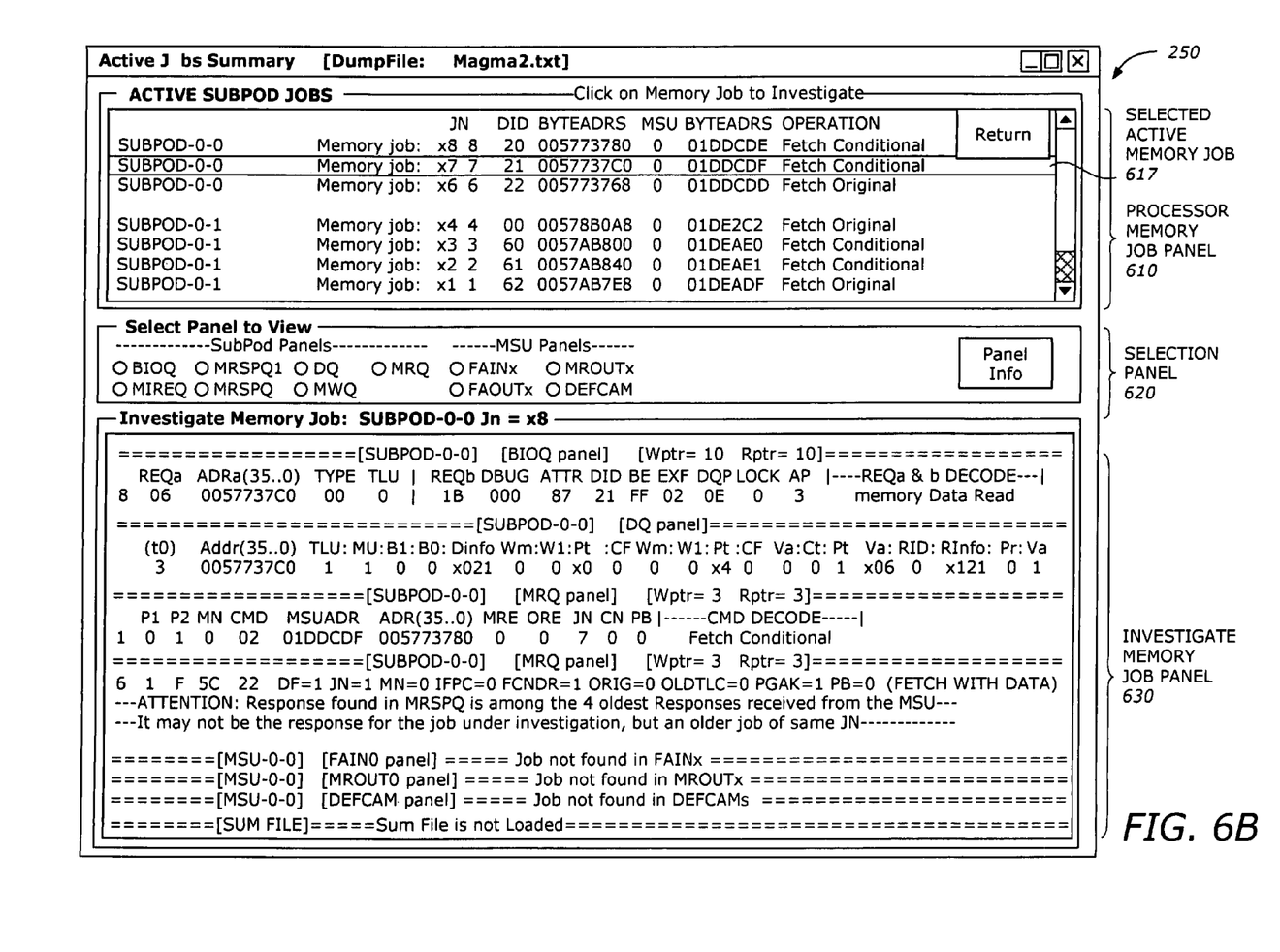
FIG. 6B is a diagram illustrating a memory job window for a second job according to one embodiment of the invention.

FIG. 6B is a diagram illustrating the memory job window 250 for a second job according to one embodiment of the invention. The memory job window 250 has the same organization as in FIG. 6A with a selected active memory job 617 for the job number 7 (JN=7) for the subpod 0-0.

The state information for this second job 617 provides additional information that helps the user to derive some conclusion regarding the system failure. The memory response area 638 indicates that there is a response back from the memory. From this information, a possible conclusion is that the system was stopped not by a memory operation, but rather by some other fault or faults. The user may then focus his or her analysis to other causes of fault.

The examples in FIGS. 6A and 6B show that the state information of the active jobs and the active memory jobs may be combined to provide the diagnostic information. The automatic analysis provided by the above windows and panels provides the much needed information for the user to facilitate the user's analysis. The GUI in the browser tool therefore provides many benefits: (1) it reduces the level of expertise for many problem evaluations, (2) it reduces the time necessary to pinpoint a hardware problem, and (3) it may be used as a training method in teaching data flow through the various units in the system.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    (a) showing, in a job summary window, state information of jobs in at least a unit panel, the unit panel representing at least a functional unit in a computer system; and
    (b) showing, in a memory job window, state information of memory jobs in a functional unit selected from the unit panel to provide diagnostic information to the user, the state information being obtained from a panel dump file retrieved from the computer system.

2. The method of claim 1 wherein the functional unit is one of a processor unit, a memory unit, and an input/output (I/O) unit.

3. The method of claim 2 wherein operation (a) comprises:
    displaying, in a processor panel in the job summary window, status of memory jobs and memory-mapped jobs in the processor unit.

4. The method of claim 3 wherein the state information of the active jobs and the active memory jobs are combined to provide the diagnostic information.

5. The method of claim 2 wherein operation (a) comprises:
    displaying, in a memory panel in the job summary window, status of memory and memory-mapped jobs in the memory unit.

6. The method of claim 2 wherein operation (a) comprises:
    displaying, in an I/O panel in the job summary window, status of memory-mapped jobs initiated by the I/O unit.

7. The method of claim 1 wherein operation (b) comprises:
    displaying, in a processor memory job panel in the memory job window, a list of active memory jobs; and
    displaying, in an investigate memory job panel in the memory job window, detailed information on an active memory job selected from the list in the processor memory job panel.

8. The method of claim 7 wherein operation (b) comprises:
    displaying, in a processor bus area in the investigate memory job panel, state information of the selected active memory job originated from a processor bus;
    displaying, in a deferred queue area in the investigate memory job panel, state information of the selected active memory in a deferred queue;
    displaying, in a memory queue area in the investigate memory job panel, state information of the selected active memory job in a memory request queue; and
    displaying, in a memory response queue area in the investigate memory job panel, state information of the selected active memory job in the memory response queue.

9. The method of claim 7 wherein the state information includes at least one of:
    a job identifier to identify an active job;
    a deferred identifier to identify the active job as seen at a processor bus interface of a processor;
    a processor address associated with the active job as generated by the processor;
    a memory unit identifier to specify a memory unit that the active job is destined for;
    a memory address to specify a cache-line address of the active job at the memory unit;
    an operation indicator to indicate a memory operation type of the active job; and
    a processor identifier to identify the processor.

10. The method of claim 1 wherein the computer system is a cellular multiprocessor system.

11. An article of manufacture comprising:
    a machine-accessible storage medium including data that, when accessed by a machine, cause the machine to perform operations comprising:
    showing, in a job summary window, state information of jobs in at least a unit panel, the unit panel representing at least a functional unit in a computer system; and
    showing, in a memory job window, state in formation of memory jobs in a functional unit selected from the unit panel to provide diagnostic information to the user, the state information being obtained from a panel dump file retrieved from the computer system.

12. The article of manufacture of claim 11 wherein the functional unit is one of a processor unit, a memory unit, and an input/output (I/O) unit.

13. The article of manufacture of claim 12 wherein the data causing the machine to perform operation (a) comprise data that, when accessed by the machine, cause the machine to perform operations comprising:
    displaying, in a processor panel in the job summary window, status of memory jobs and memory-mapped jobs in the processor unit.

14. The article of manufacture of claim 13 wherein the state information of the active jobs and the active memory jobs are combined to provide the diagnostic information.

15. The article of manufacture of claim 12 wherein the data causing the machine to perform operation (a) comprise data that when accessed by the machine, cause the machine to perform operators comprising:
    displaying, in a memory panel in the job summary window, status of memory and memory-mapped jobs in the memory unit.

16. The article of manufacture of claim 12 wherein the data causing the machine to perform operation (a) comprise data that, when accessed by the machine, cause the machine to perform operations comprising:
    displaying, in an I/O panel in the job summary window, status of memory-mapped jobs initiated by the I/O unit.

17. The article of manufacture of claim 11 wherein the data causing the machine to perform operation (b) comprise data that, when accessed by the machine, cause the machine to perform operations comprising:

displaying, in a processor memory job panel in the memory job window, a list of active memory jobs; and displaying, in an investigate memory job panel in the memory job window, detailed information on an active memory job selected from the list in the processor memory job panel.

18. The article of manufacture of claim 17 wherein the data causing the machine to perform operation (b) comprise data that, when accessed by the machine, cause the machine to perform operations comprising:

displaying, in a processor bus area in the investigate memory job panel, state information of the selected active memory job originated from a processor bus;

displaying, in a deferred queue area in the investigate memory job panel, state information of the selected active memory in a deferred queue;

displaying in a memory queue area in the investigate memory job panel, state information of the selected active memory job in a memory request queue; and displaying, in a memory response queue area in the investigate memory job panel, state information of the selected active memory job in the memory response queue.

19. The article of manufacture of claim 17 wherein the state information includes at least one of:

a job identifier to identify an active job;

a deferred identifier to identify the active job as seen at a processor bus interface of a processor;

a processor address associated with the active job as generated by the processor;

a memory unit identifier to specify a memory unit that the active job is destined for;

a memory address to specify a cache-line address of the active job at the memory unit;

an operation indicator to indicate a memory operation type of the active job; and a processor identifier to identify the processor.

20. The article of manufacture of claim 11 wherein the computer system is a cellular multiprocessor system.

21. A system comprising:

a processor; and a memory coupled to the processor, the memory containing instructions that, when executed by the processor, cause the processor to:

show, in a job summary window, state information of jobs in at least a unit panel, the unit panel representing at least a functional unit in a computer system; and show, in a memory job window, state information of memory jobs in a functional unit selected from the unit panel to provide diagnostic information to the user, the state information being obtained from a panel dump file retrieved from the computer system.

22. The system of claim 21 wherein the functional unit is one of a processor unit, a memory unit, and an input/output (I/O) unit.

23. The system of claim 22 wherein the instructions causing the processor to show, in a job summary window, state information of jobs comprise instructions that, when executed by the processor, cause the processor to:

display, in a processor panel in the job summary window, status of memory jobs and memory-mapped jobs in the processor unit.

24. The system of claim 23 wherein the state information of the active jobs and the active memory jobs are combined to provide the diagnostic information.

25. The system of claim 22 wherein the instructions causing the processor to show, in a job summary window, state information of jobs comprise instructions that, when executed by the processor, cause the processor to:

display, in a memory panel in the job summary window, status of memory and memory-mapped jobs in the memory unit.

26. The system of claim 22 wherein the instructions causing the processor to show, in a job summary window, state information of jobs comprise instructions that, when executed by the processor, cause the processor to:

display, in an I/O panel in the job summary window, status of memory-mapped jobs initiated by the I/O unit.

27. The system of claim 21 wherein the instructions causing the processor to show, in a memory job window, state information of memory jobs comprise instructions that, when executed by the processor, cause the processor to:

display, in a processor memory job panel in the memory job window, a list of active memory jobs; and display, in an investigate memory job panel in the memory job window, detailed information on an active memory job selected from the list in the processor memory job panel.

28. The system of claim 27 wherein the instructions causing the processor to show, in a memory job window, state information of memory jobs comprise instructions that, when executed by the processor, cause the processor to:

display, in a processor bus area in the investigate memory job panel, state information of the selected active memory job originated from a processor bus;

display, in a deferred queue area in the investigate memory job panel, state information of the selected active memory in a deferred queue;

display, in a memory queue area in the investigate memory job panel, state information of the selected active memory job in a memory request queue; and display, in a memory response queue area in the investigate memory job panel, state information of the selected active memory job in the memory response queue.

29. The system of claim 27 wherein the state information includes at least one of:

a job identifier to identify an active job;

a deferred identifier to identify the active job as seen at a processor bus interface of a processor;

a processor address associated with the active job as generated by the processor;

a memory unit identifier to specify a memory unit that the active job is destined for;

a memory address to specify a cache-line address of the active job at the memory unit;

an operation indicator to indicate a memory operation type of the active job; and a processor identifier to identify the processor.

30. The system of claim 21 wherein the computer system is a cellular multiprocessor system.

* * * * *